Patented Feb. 21, 1950

2,497,926

UNITED STATES PATENT OFFICE 2,497,926

RESINS FROM ESTERS OF 1-HYDROXY-BUTADIENE-1,3 INSOLUBILIZED WITH NITROGEN BASES

Herman A. Bruson, Rydal, Pa., assignor, by mesne assignments, to Rohm & Haas Company, Philadelphia, Pa., a corporation of Delaware No Drawing. Application July 28, 1945, Serial No. 607,655

9 Claims. (Cl. 260—89.1)

This invention relates to synthetic resins. More particularly, this invention relates to insoluble, non-thermoplastic resins derived from polymerized esters of hydroxybutadiene.

By polymerization of esters of simple carboxylic acids and 1-hydroxy-butadiene-1,3 there are obtained resinous materials of high molecular weight which are thermoplastic and soluble in many types of organic media. These materials are of but limited value in the field of protective coatings because films formed therefrom are brittle and are seriously affected by organic solvents even after the films have been baked for prolonged periods of time. Furthermore, such films readily soften under the influence of heat and become tacky and sticky. They are not resistant to hot water.

One of the objects of this invention is to provide a method whereby thermoplastic polymeric esters of 1-hydroxy-butadiene-1,3 or copolymers thereof with other compatible unsaturated, polymerizable compounds can be rendered non-thermoplastic and insoluble in organic solvents. Another object is to provide resins which yield extremely hard, marproof, tough, flexible, waterproof films which may find particular application for coating sheet metal.

According to this invention, the above objects are attained by reacting a thermoplastic polymer or copolymer of an ester of 1-hydroxy-butadiene-1,3 with a nitrogenous base or a salt thereof, in which there is present in the molecule at least one basic hydrogen-bearing nitrogen atom. Such bases include ammonia and primary and secondary amines, for example, methylamine, dimethylamine, ethylamine, diethylamine, and their higher homologues, allylamine, piperidine, pyrrolidine, morpholine, piperazine, aniline, methylaniline, benzylamine, cyclohexylamine, ethylene diamine, propylene diamine, hexamethylene diamine, decamethylene diamine, diethylene triamine, dipropylene triamine, triethylene tetramine, guanidine, hydrazine, hydroxylamine, ethanolamine, diethanolamine, and their heat-dissociable salts with volatilizable acids, such as carbonates, acetates, hydrochlorides, and thiocyanates. The amines which are volatile below 200° C. are to be preferred. Ammonia is also a basic nitrogen compound of considerable interest for the purposes of this invention.

It has been found that the polymeric esters of 1-hydroxy-butadiene-1,3 react with the above nitrogenous bases or their salts to form deep red-colored nitrogenous resins which are extremely susceptible to cross-linking and which either upon prolonged standing or heating go over to an infusible, insoluble condition.

The mechanism by which this takes place is not clear, but it is believed that a splitting out of the organic acid of the polymerized ester occurs with the formation of another conjugated double bond in the polymer and the subsequent addition of basic nitrogen compound to the polyene system formed.

The amount of basic trivalent nitrogen compound required varies from a comparative trace to a full molar quantity or more, based on the ester. In many cases as small an amount as 0.1% of basic nitrogen compound having hydrogen on the nitrogen is sufficient to cause the otherwise soluble polyester to become insoluble and non-thermoplastic, the percentage being based on the polyester in molar terms. A most marked effect is obtained as the proportion of ammonia or primary amine reaches about 10%, while with secondary amines very much higher proportions can be used without rapid setting of the resin resulting therefrom. Basic nitrogen compounds with more than one hydrogen atom on a nitrogen atom apparently serve not only to dehydroacylate the polyesters but also to form nitrogen linkages, different in this respect from compounds with only one hydrogen on an amino nitrogen which appear to dehydroacylate and to add to the polyesters.

The polymer of the ester or copolymer from the ester is preferably treated with the reactive basic nitrogen compound in solvent solution. The reaction between polymeric materials and basic nitrogen compounds begins even at room temperatures and is more rapidly effected at elevated temperatures. The reaction may be initiated at a lower temperature and completed at a higher temperature, such as 150° to 200° C., as when a solution of polyester is treated with ammonia or reactive amine and applied as a lacquer to an object which is then baked. On the other hand, a polyester or a copolymer from such ester may be applied to an object which is subsequently treated with a basic nitrogen compound itself, the vapors thereof, or a solution thereof to convert the original polymer to a resin of the type here described.

The most useful esters of 1-hydroxy-butadiene-1,3 are those made with saturated aliphatic carboxylic acids of two to four carbon atoms, acetic, propionic, butyric, and isobutyric, or mixtures thereof. These esters may be polymerized by being heated alone or with an organic solvent, such as glycol ethers, for example ethoxyethanol, aromatic hydrocarbons such as toluene, or ketones such as acetone or methyl hexyl ketone. Peroxide catalysts may be used if so desired. Instead of the ester being converted to a simple polyester, the ester may be mixed with another polymerizable organic material which is miscible and which forms copolymers therewith, such as styrene and acrylonitrile.

In order to illustrate this invention, the following examples are given:

Example 1

A solution of 591 grams of 1-acetoxy-butadiene-1,3, $CH_2=CH-CH=CH-OCOCH_3$, in 197 grams of glycol monoethyl ether ("Cellosolve"), containing five grams of 60% tertiary butyl hydroperoxide, was heated under a reflux condenser on a steam bath at 95°–100° C. for twenty-four hours. To the resulting viscous solution five additional grams of 60% tertiary butyl hydroperoxide was added and the heating continued for twenty-nine hours longer at 95°–100° C. There resulted a very viscous solution of polymer which contained by analysis 61% solids. This solution was diluted with sufficient ethoxyethanol to give a solution containing 20% of solid polymer. This is hereafter referred to as "polymer solution."

(a) A thin film of this polymer solution was cast upon a tinned sheet iron panel of the type used for fabricating tin cans and allowed to air-dry for thirty minutes. The panel was then baked for thirteen minutes at 190° C. (370° F.). The film obtained was clear, colorless, and very brittle at ordinary temperatures. At 150° C. it was sticky. It was easily removed from the panel with acetone or benzene, and, when boiled in water for one hour, it turned white and could be peeled from the panel.

(b) In contrast to this, 100 grams of the polymer solution described above was mixed with four grams of a 10% solution of diethylene triamine in ethoxyethanol. This is equivalent to 2% by weight of diethylene triamine on the weight of polymer. The solution rapidly turned yellow and, after standing for twenty-four hours at room temperature, became dark red and increased appreciably in viscosity. A thin film of this solution was formed upon a tinned sheet iron panel and baked for thirteen minutes at 190° C. exactly as in (a) above. The film obtained was clear, golden amber and was extremely hard, tough, and flexible. The tinned panel, for example, could be punched on a press to give a bottle cap, and this could be threaded without loosening or breaking the film. Furthermore, the film was not sticky even at 190° C. and was completely insoluble in acetone or benzene. It withstood the action of boiling water for more than four hours without whitening or loosening from the panel.

If more diethylene triamine is used, for example, 10%–20% on the weight of the polymer, the polymer solution will gel upon standing for several hours. If this gel is broken up, dried to remove solvent, and the resulting powdery resin thoroughly washed with water to remove amine and salts and dried, it will be found to contain an appreciable amount of nitrogen by analysis, indicating a chemical combination of the amine with the polymer.

Example 2

Dry ammonia gas was bubbled into a 20% solution of polymerized 1-acetoxy-butadiene-1,3 in ethoxyethanol. The solution rapidly increased in viscosity, and, after about twenty minutes, it set up to a stiff transparent gel. This gel was macerated with methanol and the finely divided powdery product which resulted was washed thoroughly with methanol and with hot water. After being dried in vacuo at 100° C., it formed a reddish powder containing 2.93% nitrogen by analysis, thus establishing the fact that the polymer combines with the base.

Example 3

A mixture of 56 grams of 1-acetoxy-butadiene-1,3, 26.5 grams of acrylonitrile, 27.5 grams of methyl ethyl ketone, and 0.7 gram of 60% tertiary butyl hydroperoxide was heated for twenty-one hours at 95°–100° C. under a reflux condenser. At the end of this time, 0.7 additional gram of 60% tertiary butyl hydroperoxide was added, and the mixture was heated for eight hours longer. A clear, viscous solution of copolymer was obtained, containing 64.5% solids. This was diluted with methyl ethyl ketone to give a solution containing 25% solids.

To 66 grams of this 25% solution there was added 8.7 grams of morpholine and the solution allowed to stand for about four hours. The crystalline deposit was filtered off. It weighed three grams and was identified as morpholine acetate, having a melting point of 115°–116° C. The clear filtrate was cast on a tinned sheet iron panel to give a thin film, and the panel was baked for twenty minutes at 160° C. A clear, amber-colored, hard, tough, flexible film was obtained. The film was not thermoplastic at 175° C. and was insoluble in organic solvents. The panel could be bent double over a ¼" mandrel without crazing.

Example 4

To 50 grams of a 20% polyacetoxybutadiene solution in Cellosolve, made as described in Example 1, there was added 1.5 grams of ammonium thiocyanate crystals and the mixture shaken until a clear solution resulted. The solution gradually turned deep red on standing for twenty-four hours. A film of the solution was cast upon bare copper wire and baked for ten minutes at 200° C. A hard, tough, almost jet-black coating on the wire was obtained. The wire could be bent and twisted without breaking the coating. It resisted boiling water in a test lasting five hours and was insoluble in organic solvents.

In a similar manner, the polymerized propionate or butyrate of 1-hydroxy-butadiene-1,3 can be used in place of the acetate.

I claim:

1. A method for converting a thermoplastic, soluble polymer of an ester of 1-hydroxy-1,3-butadiene and an aliphatic, monocarboxylic acid of two to four carbon atoms into a non-thermoplastic, insoluble resin which comprises reacting below 200° C. said polymer with a basic nitrogen compound from the class consisting of (1) nitrogenous bases having at least one hydrogen atom attached to a trivalent nitrogen atom thereof and containing at most ten carbon atoms per molecule and (2) salts of said bases and volatilizable acids, said salts being heat-dissociable below 200° C., the proportion of said nitrogen compound being between 0.1% of the weight of the soluble polymer and one molar quantity of the said nitrogen compound per ester unit of said polymer and being sufficient to promote cross-linking in the resulting resin and render it infusible and insoluble in acetone and benzene when heated below 200° C.

2. A method for converting a thermoplastic, soluble polymer of 1-acetoxy-1,3-butadiene into a non-thermoplastic, insoluble resin which comprises reacting below 200° C. said polymer with a basic nitrogen compound from the class consisting of (1) nitrogenous bases having at least one hydrogen atom attached to a trivalent nitrogen atom thereof and containing at most ten carbon atoms per molecule and (2) salts of said bases and volatilizable acids, said salts being heat-dissociable below 200° C., the proportion of said nitrogen compound being between 0.1% of the weight of the soluble polymer and one molar quantity of said nitrogen compound per acetoxy group of said polymer and being sufficient to promote cross-linking in the resulting resin and render it infusible and insoluble in acetone and benzene when heated below 200° C.

3. A method for converting a thermoplastic, soluble polymer of 1-acetoxy-1,3-butadiene into a non-thermoplastic, insoluble resin which comprises reacting below 200° C. said soluble polymer and diethylene triamine, the proportion of said triamine being between 0.1% and 20% of the weight of the said soluble polymer and being sufficient to promote cross-linking in the resulting resin and render it insoluble in acetone and benzene when heated below 200° C.

4. A method for converting a thermoplastic, soluble polymer of 1-acetoxy-1,3-butadiene into a non-thermoplastic, insoluble resin which comprises reacting below 200° C. said soluble polymer and morpholine, the proportion of said morpholine being between 0.1% and 20% of the weight of the said soluble polymer and being sufficient to promote cross-linking in the resulting resin and render it insoluble in acetone and benzene when heated below 200° C.

5. A method for converting a thermoplastic, soluble polymer of 1-acetoxy-1,3-butadiene into a non-thermoplastic, insoluble resin whic comprises reacting below 200° C. said soluble polymer and ammonia, the proportion of said ammonia being between 0.1% and 10% of the weight of the said soluble polymer and being sufficient to promote cross-linking in the resulting resin and render it insoluble in acetone and benzene when heated below 200° C.

6. As a new composition of matter, a non-thermoplastic, insoluble resin containing chemically bound nitrogen, said insoluble resin resulting by reacting below 200° C. a soluble polymer of 1-acetoxy-1,3-butadiene with a nitrogenous base having at least one hydrogen atom attached to a trivalent nitrogen atom thereof and containing at most ten carbon atoms per molecule in an amount between 0.1% of the weight of said polymer and a molar quantity of said base per acetoxy group of said polymer.

7. As a new composition of matter, a non-thermoplastic, insoluble resin containing chemically bound nitrogen, said insoluble resin being obtained by reacting below 200° C. a soluble polymer of 1-acetoxy-1,3-butadiene with 0.1% to 10% of its weight of ammonia.

8. As a new composition of matter, a non-thermoplastic, insoluble resin containing chemically bound nitrogen, said insoluble resin being obtained by reacting below 200° C. a soluble polymer of 1-acetoxy-1,3-butadiene with 0.1% to 20% of its weight of diethylene triamine.

9. The method of claim 5 wherein the ammonia is supplied by mixing ammonium triocyanate with the 1-acetoxy-butadiene-1,3 polymer and heating the resulting mixture below 200° C.

HERMAN A. BRUSON.

REFERENCES CITED

The following references are of record in the file of this patent:

UNITED STATES PATENTS

| Number | Name | Date |
|---|---|---|
| 2,292,291 | Bock | Aug. 11, 1942 |
| 2,309,088 | Auer | Jan. 26, 1943 |
| 2,344,085 | Halbig | Mar. 14, 1944 |
| 2,364,186 | Bersworth | Dec. 5, 1944 |